United States Patent
Arimitsu et al.

(10) Patent No.: US 6,838,790 B2
(45) Date of Patent: Jan. 4, 2005

(54) STATOR OF TWO ROTOR SINGLE STATOR TYPE ELECTRIC MOTOR

(75) Inventors: Minoru Arimitsu, Kanagawa (JP); Masaki Nakano, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/830,105

(22) Filed: Apr. 23, 2004

(65) Prior Publication Data

US 2004/0232779 A1 Nov. 25, 2004

(30) Foreign Application Priority Data

May 23, 2003 (JP) ...................................... 2003-146525

(51) Int. Cl.⁷ .............................................. H02K 1/04
(52) U.S. Cl. ...................... 310/43; 310/114; 310/216; 310/259
(58) Field of Search .................. 310/43, 45, 112–114, 310/213–218, 254, 258, 259

(56) References Cited

U.S. PATENT DOCUMENTS

| | | | | |
|---|---|---|---|---|
| 2,695,969 A | * | 11/1954 | Yates ......................... | 310/259 |
| 4,137,471 A | * | 1/1979 | Sato et al. .................... | 310/51 |
| 6,114,784 A | | 9/2000 | Nakano | |
| 2004/0119466 A1 | | 6/2004 | Akatsu et al. | |

FOREIGN PATENT DOCUMENTS

JP          2000-14086 A          1/2000

OTHER PUBLICATIONS

U.S. Appl. No. 10/895,420, filed Jul. 21, 2004, Arimitsu et al.

* cited by examiner

Primary Examiner—Dang Le
(74) Attorney, Agent, or Firm—Foley & Lardner LLP

(57) ABSTRACT

A stator for use in a two rotor single stator type electric motor includes a stator core including a plurality of stator teeth that are circumferentially arranged around a common axis leaving a plurality of identical spaces each being defined between adjacent two of the stator teeth. Each stator tooth includes a plurality of flat magnetic steel plates that are aligned along the common axis. A plurality of coils are put around the stator teeth respectively. Bolts extend through identical spaces of the stator core for combining the flat magnetic steel plates to have a fixed structure of the stator core. A molded plastic fills the identical spaces of the stator core. A plurality of elongate plate bars extend in the identical spaces through the molded plastic respectively. Each elongate plate bar extends in parallel with the common axis and is constructed of a magnetic material that has an electric resistance higher than the bolts.

12 Claims, 7 Drawing Sheets

STATOR OF TWO ROTOR SINGLE STATOR TYPE ELECTRIC MOTOR

BACKGROUND OF INVENTION

1. Field of Invention

The present invention relates in general to electric motors, and more particularly to electric motors of a two rotor single stator type which comprises outer and inner rotors which rotate around and within a common stator. More specifically, the present invention is concerned with a stator for the two rotor single stator type electric motor.

2. Description of Related Art

One electric motor of the above-mentioned type is shown in Japanese Laid-open Patent Application (Tokkai) 2000-14086. In the electric motor of this published application, upon feeding a compound electric current to a common stator, two rotors, that is, outer and inner rotors are rotated around and within the common stator respectively. By varying the nature of the compound electric current fed to the stator, rotation of the outer rotor and that of the inner rotor are individually controlled.

The stator of the electric motor of the published application comprises a stator core that includes a plurality of stator teeth that are circumferentially arranged around a common axis of the motor at evenly spaced intervals. Each stator tooth has a generally rectangular parallelepiped shape and includes a plurality of pressed flat magnetic steel plates that are aligned along the common axis while intimately and closely contacting to one another. Thus, upon assembly, the stator core has a waterwheel shape having a plurality of vanes (viz., stator teeth) circumferentially arranged about an axis of the stator. Each stator tooth has a coil that is put therearound making round-trips in a direction parallel with the common axis. The stator core thus assembled is sandwiched between two axially spaced supporting brackets and tightened by a plurality of bolts and nuts. Each bolt extends in a direction parallel with the common axis in and along a space defined between adjacent two of the stator teeth. The space is filled with a molded plastic. Thus, upon completion of assembly, the stator has a cylindrical shape.

In order to effectively generate a magnetic flux in the magnetic path, each stator tooth has at radially outer and inner ends thereof yoke portions that project in a circumferential direction. Due to provision of such yoke portions, an outward magnetic resistance (which will be referred to "magnetic bypass resistance" hereinafter) of each stator tooth is increased, and thus, undesired outward dispersal of the magnetic flux through the stator tooth is suppressed or at least minimized.

As is described hereinabove, the space defined between adjacent two of the stator teeth is filled with a molded plastic through which the connecting bolts extend axially. One end of each bolt is connected to a motor housing, so that the stator is held by the motor housing in a so-called cantilever holding way. Also the bolts function to generate the magnetic bypass resistance.

SUMMARY OF THE INVENTION

As is described hereinabove, in the electric motor of the published application, the magnetic bypass resistance is mainly generated by the yoke portions of each stator tooth and the bolts. However, it has been revealed that such measures for producing the magnetic bypass resistance brings about an increase in cost of the electric motor due to the complicated shape of the stator teeth and a time-consumed assembling work.

It is therefore an object of the present invention to provide a stator for use in a two rotor single stator type electric motor, which is free of the above-mentioned drawbacks and provides the associated electric motor with a sufficient motor performance.

In accordance with a first aspect of the present invention, there is provided a stator for use in a two rotor single stator type electric motor in which inner and outer rotors are rotated independently in and around the stator upon application of current to the stator, the stator comprising a stator core including a plurality of stator teeth that are circumferentially arranged around a common axis at evenly spaced intervals leaving a plurality of identical spaces each being defined between adjacent two of the stator teeth, each stator tooth including a plurality of flat magnetic steel plates that are aligned along the common axis while intimately and closely contacting to one another; a plurality of coils put around the stator teeth respectively; bolts that extend through the identical spaces of the stator core in a direction parallel with the common axis for combining the flat magnetic steel plates to have a fixed structure of the stator core; a molded plastic that fills the identical spaces of the stator core; and a plurality of elongate plate bars that extend in the identical spaces through the molded plastic respectively, each elongate plate bar extending in parallel with the common axis and being constructed is of a magnetic material that has an electric resistance higher than the bolts.

In accordance with a second aspect of the present invention, there is provided a stator for use in a two rotor single stator type electric motor in which inner and outer rotors are rotated independently in and around the stator upon application of a compound electric current to the stator, the stator comprising a stator core including a plurality of stator teeth that are circumferentially arranged around a common axis at evenly spaced intervals leaving a plurality of identical spaces each being defined between adjacent two of the stator teeth, each stator tooth including a plurality of flat magnetic steel plates that are aligned along the common axis while intimately and closely contacting to one another; a plurality of coils put around the stator teeth respectively; two supporting brackets between which the stator teeth of the stator core are sandwiched; bolts and nuts that fasten the two supporting brackets to tightly and intimately connect the magnetic steel plates of each stator tooth to one another, the bolts extending through the identical spaces in parallel with the common axis; a molded plastic that fills the identical spaces of the stator core; and a plurality of elongate plate bars that extend in the identical spaces through the molded plastic respectively, each elongate plate bar extending in parallel with the common axis and being constructed of a magnetic material that has an electric resistance higher than the bolts.

In accordance with a third aspect of the present invention, there is provided a two rotor single stator type electric motor powered by a compound electric current, which comprises a cylindrical stator that includes a stator core including a plurality of stator teeth that are circumferentially arranged around a common axis at evenly spaced intervals leaving a plurality of identical spaces each being defined between adjacent two of the stator teeth, each stator tooth including a plurality of flat magnetic steel plates that are aligned along the common axis while intimately and closely contacting to one another; a plurality of coils put around the stator teeth respectively; bolts that extend through the identical spaces of the stator core in a direction parallel with the common axis for combining the flat magnetic steel plates to have a fixed structure of the stator core; a molded plastic that fills the identical spaces of the stator core; and a plurality of elongate plate bars that extend in the identical spaces through the molded plastic respectively, each elongate plate bar extending in parallel with the common axis and being constructed of a magnetic material that has an electric resistance higher than the bolts; a cylindrical inner rotor rotatably received in the cylindrical stator, the inner rotor having a plurality of permanent magnets disposed thereon; and a cylindrical outer rotor rotatably disposed around the cylindrical stator, the outer rotor having a plurality of permanent magnets disposed thereon.

DETAILED DESCRIPTION OF THE INVENTION

In the following, the present invention will be described in detail with reference to the accompanying drawings.

For ease of understanding, various directional terms such as right, left, upper, lower, rightward and the like are used in the following description. However, such terms are to be understood with respect to only a drawing or drawings on which the corresponding part or portion is shown.

Figure 1:
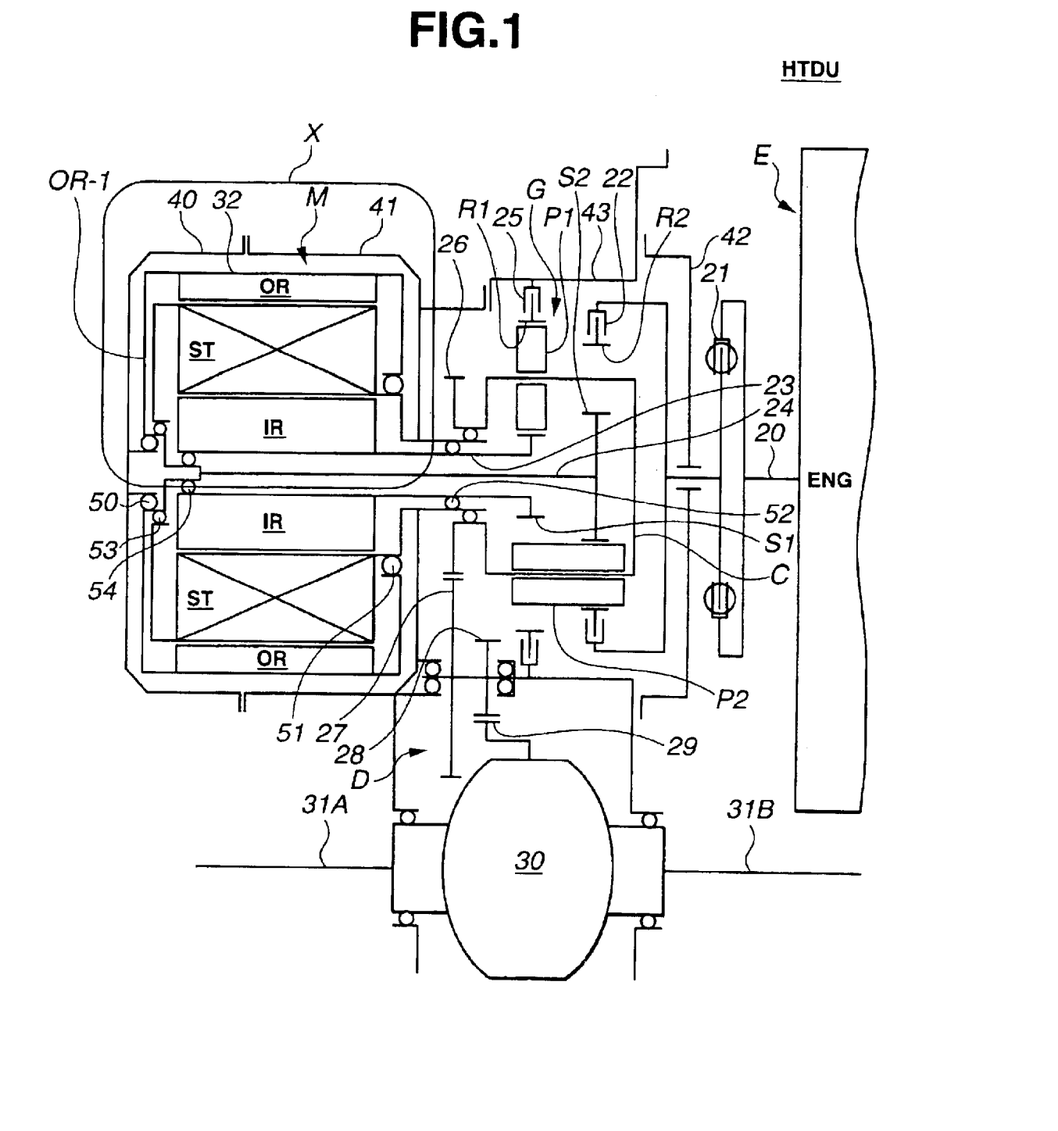
FIG. 1 is a schematic view of a hybrid type drive unit for a wheeled motor vehicle, to which a two rotor single stator type electric motor is practically applied.

In FIG. 1, there is shown a hybrid type drive unit HTDU for a wheeled motor vehicle, to which a two rotor single stator type electric motor is practically applied.

The hybrid type drive unit HTDU comprises generally an engine (viz., internal combustion engine or the like) E, a two rotor single stator type electric motor M, a ravigneawx type planetary gear unit G and a drive output mechanism D.

Engine E is a prime mover of the drive unit HTDU, which has an output shaft 20 that is connected to a second ring gear R2 of the planetary gear unit G through a rotation fluctuation absorbing damper 21 and a multiple disc clutch 22, as shown.

Electric motor M is an auxiliary mover of the drive unit HTDU, which has two motor generator functions. As shown, electric motor M is installed in a space defined by both a motor cover 40 and a motor case 41 and is connected to motor case 41.

Electric motor M comprises a cylindrical stator ST that has a plurality of coils disposed thereabout, a cylindrical inner rotor IR that is rotatably arranged in stator ST and has a plurality of permanent magnets disposed thereon, a cylindrical outer rotor OR that is rotatably arranged around stator ST and has a plurality of permanent magnets disposed thereon. As shown, stator ST, inner rotor IR and outer rotor OR are concentrically arranged to constitute a triple-layer cylindrical construction.

Figure 2:
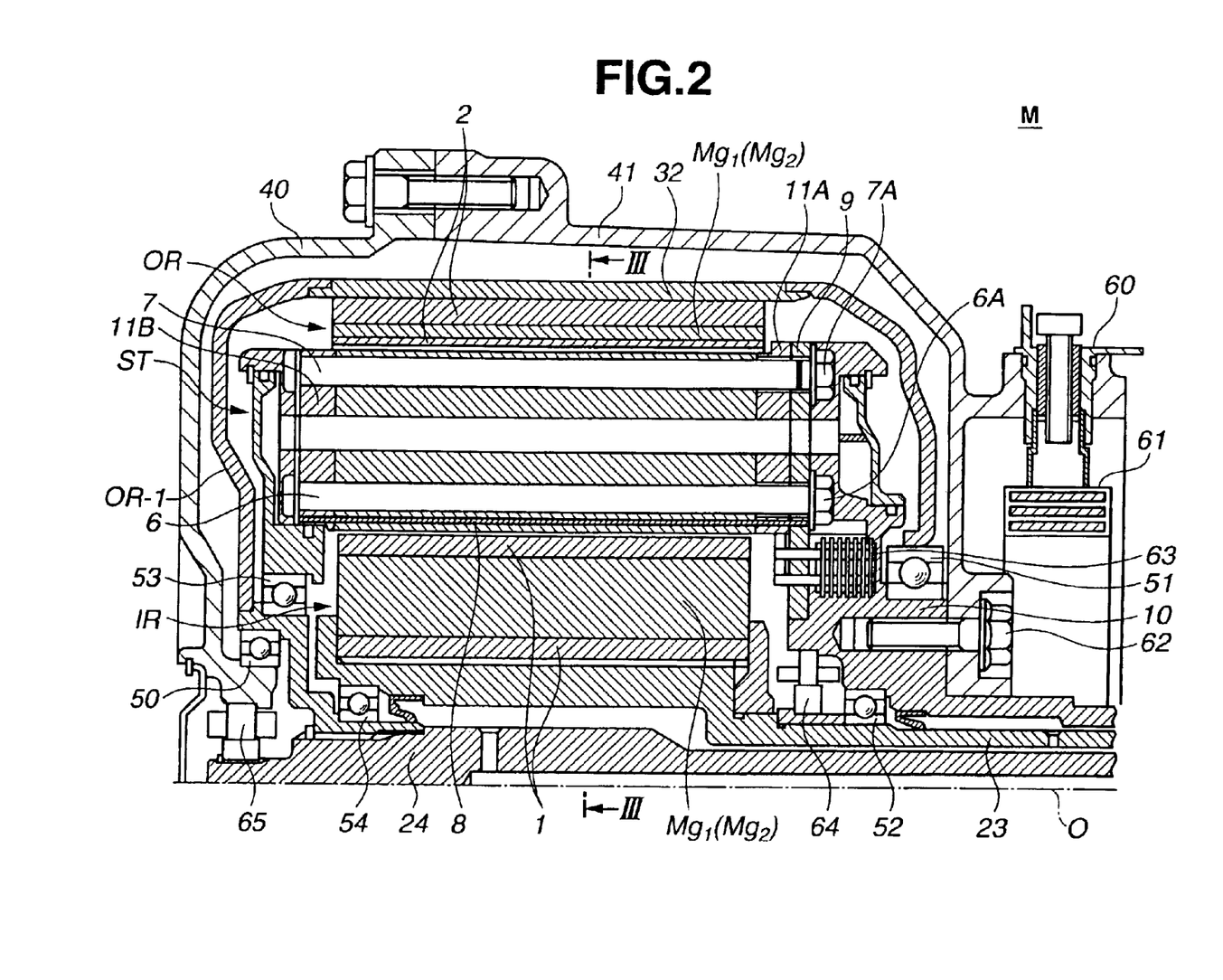
FIG. 2 is a sectional view of an upper half of the electric motor in which a stator of a first embodiment of the present invention is practically used.

As is seen from FIGS. 1 and 2, a first shaft 23 that is hollow is coaxially connected to inner rotor IR to rotate therewith. This hollow first shaft 23 axially extends rightward to connect to a first sun gear S1 of planetary gear unit G. A second shaft 24 that is also hollow (see FIG. 2) is connected through a torque transmission plate OR-1 to outer rotor OR to rotate therewith. This second shaft 24 extends rightward in the hollow first shaft 23 to connect to a second sun gear S2 of planetary gear unit G, as shown.

Ravigneawx type planetary gear unit G is a continuously variable transmission mechanism that inputs a power or torque from at least one of engine E and electric motor E and continuously varies the rotation speed of an power outputted therefrom. As shown, planetary gear unit G is installed in a space defined by a front cover 42 and a gear housing 43.

That is, planetary gear unit G comprises a common carrier C that carries mutually meshed first and second pinions P1 and P2, the above-mentioned first sun gear S1 that is meshed with first pinions P1, the above-mentioned second sun gear S2 that is meshed with second pinions P2, a first ring gear R1 that is meshed with first pinions P1, and a second ring gear R2 that is meshed with second pinions P2. Between first ring gear R1 and gear housing 43, there is arranged a multi disc brake 25, and to the common carrier C, there is connected an output gear 26.

Drive output mechanism D comprises the above-mentioned output gear 26, a first counter gear 27 that is meshed with output gear 26, a second counter gear 28 that is integral with first counter gear 27, a drive gear 29 that is meshed with second counter gear 28, a differential gear 30 that is meshed with drive gear 29 and drive shafts 31A and 31B that extend leftward and rightward from differential gear 30 respectively. Thus, a torque led to output gear 26 from planetary gear unit G is led through first counter gear 27, second counter gear 28, drive gear 29 and differential gear 30 to left and right drive shafts 31A and 31B thereby to move an associated motor vehicle through drive road wheels (not shown).

Referring to FIG. 2, there is shown an enlarged sectional view of the two rotor single stator type electric motor M at a portion that is enclosed by a block as indicated by "X" in FIG. 1. As will be described in detail hereinafter, a stator according to the present invention is practically applied to such electric motor M.

As is seen from FIG. 2, inner rotor IR comprises a cylindrical rotor base 1 that is connected to first hollow shaft 23 and includes a plurality of pressed out flat magnetic steel plates aligned along a common axis O of electric motor M. Thus, inner rotor IR and first hollow shaft 23 rotate about the common axis O together like a single unit.

Figure 3:
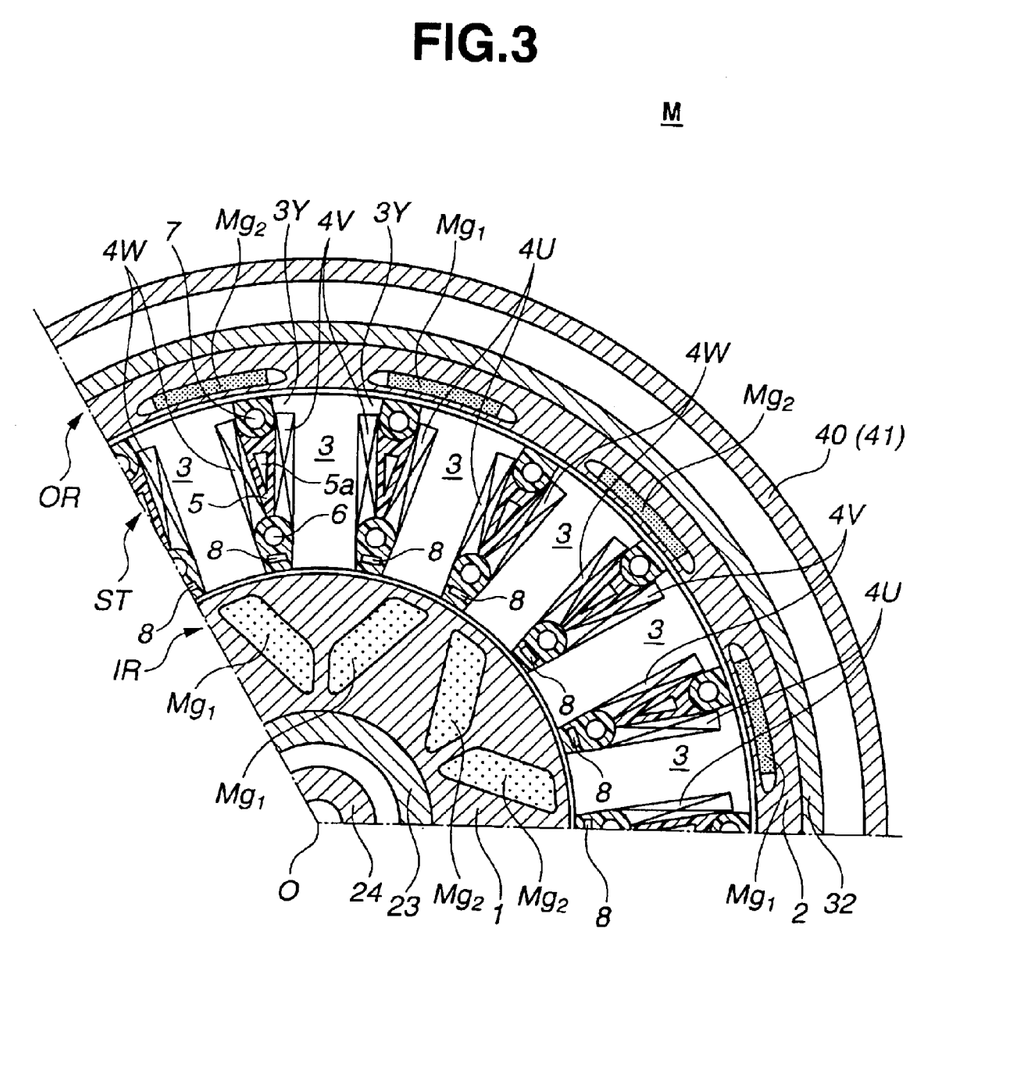
FIG. 3 is an enlarged partial sectional view of the electric motor that is equipped with the stator of the first embodiment, which is taken along the line III—III of FIG. 2.

As is seen from FIG. 3 that is a sectional view taken along the line III—III of FIG. 2, in the rotor base 1, there are embedded twelve permanent magnets Mg1 and Mg2. As is understood from the drawing, six pairs of permanent magnets are arranged in the rotor base 1 at equally spaced intervals, each pair including two identical magnets Mg1 and Mg1 or two identical magnets Mg2 and Mg2. These two magnets Mg1 and Mg2 are different in polarity. More specifically, two identical magnets Mg1 and Mg1 (or Mg2 and Mg2) of each pair are arranged to face each other with their radially outer ends largely spaced. Thus, in the rotor base 1, there are embedded a first group of three pairs of magnets Mg1 and Mg1 and a second group of three pairs of magnets Mg2 and Mg2, and these first and second groups of pairs are alternatively arranged in such a manner that a pair of magnets Mg2 and Mg2 (or Mg1 and Mg1) of one group is placed between two pairs of magnets Mg1 and Mg1 (or Mg2 and Mg2) of the other group and vice versa. Thus, in case of inner rotor IR, six polar pairs are provided.

Outer rotor OR comprises a cylindrical rotor base 2 that is secured to an inner surface of a cylindrical shell 32. Cylindrical shell 32 is connected to second hollow shaft 24 through the above-mentioned torque transmission plate OR-1. As is seen from FIG. 2, torque transmission plate OR-1 is connected to second hollow shaft 24 through a spline connection. Thus, outer rotor OR and second hollow shaft 24 rotate about the common axis O together like a single unit. Like the inner rotor IR mentioned hereinabove, rotator base 2 of outer rotor OR includes a plurality of pressed out flat magnetic steel plates aligned along the common axis O of electric motor M.

As is seen from the drawing (viz., FIG. 3), in the rotor base 2 of outer rotor OR, there are embedded twelve permanent magnets Mg1 and Mg2 which are alternatively arranged at equally spaced intervals. Unlike the above-mentioned inner rotor IR, the twelve magnets Mg1 and Mg2 are alternately arranged at equally spaced intervals. That is, in case of outer rotor OR, one magnet Mg1 (or Mg2) is placed between two identical magnets Mg2 and Mg2 (or Mg1 and Mg1). Thus, in case of outer rotor OR, three polar pairs are provided.

As is seen from FIGS. 1 and 2, outer rotor OR is rotatably held at its left and right portions by both motor cover 40 and motor case 41 through respective ball bearings 50 and 51. The left portion of outer rotor OR is rotatably held by stator ST through a ball bearing 53. Inner rotor IR is rotatably held at its left and right portions by both second hollow shaft 24 and motor case 41 through respective ball bearings 54 and 52.

As is understood from FIG. 3, cylindrical stator ST comprises a cylindrical stator core that includes a plurality (eighteen in the illustrated embodiment) of stator teeth 3 that are circumferentially arranged around the common axis O of motor M at evenly spaced intervals. Each stator tooth 3 has a generally T-shaped cross section and includes a plurality of pressed flat magnetic steel plates that are aligned along the common axis O while intimately and closely contacting to one another. That is, each stator tooth 3 has at a radially outer end thereof a yoke portion 3Y that projects in a circumferential direction, as shown.

Thus, upon assembly, the stator core has a waterwheel shape having a plurality of vanes (viz., stator teeth 3) that are circumferentially arranged about the common axis O.

As is understood from the drawing (FIG. 3), each stator tooth 3 has a coil 4U, 4V or 4W put therearound making round-trips in a direction parallel with the common axis O.

In each space defined between adjacent two of the stator teeth 3, there is filled a molded plastic 5 that has an axially extending coolant passage 5a.

Inner and outer bolts 6 and 7 extend axially in radially inner and outer portions of molded plastic 5 of each space, respectively. These bolts 6 and 7 are constructed of a non-magnetic metal, such as aluminum, stainless steel or the like.

As shown, an elongate plate bar 8 constructed of a magnetic metal extends axially in molded plastic 5 through an area defined between inner bolt 6 and a radially inner surface of stator ST. That is, elongate plate bar 8 extends in parallel with the common axis O of electric motor M.

It is to be noted that elongate plate bar 8 has an electric resistance that is higher than that of the bolts 6 and 7.

As is seen from FIG. 2, a right end portion of stator ST is fixed to motor case 41 through a right end plate 9 and a stator shaft 10.

Figure 4:
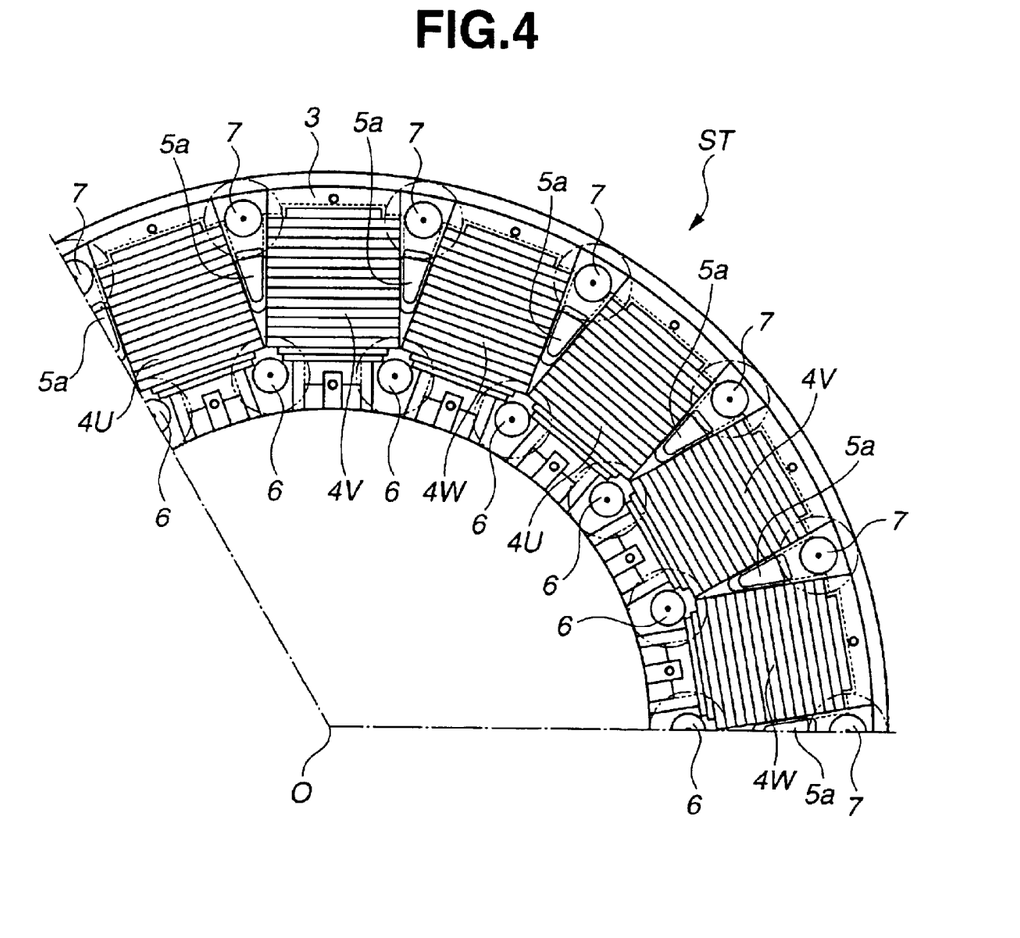
FIG. 4 is a partial back view of the electric motor that is equipped with the stator of the first embodiment.

As is seen from FIGS. 3 and 4, each coil 4U, 4V or 4W is put around the corresponding stator tooth 3 except yoke portion 3Y.

As is seen from FIG. 2, the stator core thus assembled in the above-mentioned manner is sandwiched between axially spaced two supporting brackets 11A and 11B and tightened by inner and outer bolts 6 and 7 and nuts 6A and 7A. If desired, in place of the bolts 6 and 7, rivet pins may be used for tightening the stator core.

Each elongate magnetic plate bar 8 is a laminated magnetic metal bar that comprises a plurality of magnetic steel thin plates that are combined by an insulating member, such as an insulating tape or the like.

As is described hereinabove, each elongate magnetic plate bar 8 extends axially in molded plastic 5 through the area defined between inner bolt 6 and the radially inner surface of stator ST. Thus, when the stator core having the above-mentioned construction is subjected to an injection molding for being applied with molded plastic 5, each elongate plate bar 8 can be tightly set in the proper position of the molded plastic 5 between adjacent two of the stator teeth 3, as is understood from FIG. 3. Thus, each elongate plate bar 8 can have a sufficient durability against any stress applied to stator ST.

As is seen from FIG. 4, the eighteen coils 4U, 4V and 4W of stator ST are parted into six groups each including three different coils 4U, 4V and 4W which are the coil 4U through which a U-phase current flows, the coil 4V through which a V-phase current flows and the coil 4W through which a W-phase current flows. That is, the six groups of coils 4U, 4V and 4W are arranged around common axis O of the motor M at equally spaced intervals with each group keeping the order of 4U, 4V and 4W, as shown.

Referring back to FIG. 2, to the eighteen coils 4U, 4V and 4W, there is fed a compound electric current from an inverter (not shown) through a terminal member 60, a bus bar member 61, a feeding connector member 62 and another bus bar member 63. In FIG. 2, an inner rotor speed sensor is denoted by numeral 64, which senses the rotation speed of inner rotor IR, and an outer rotor speed sensor is denoted by numeral 65, which senses the rotation speed of outer rotor OR.

Upon feeding the compound electric current to the eighteen coils 4U, 4V and 4W, the stator ST produces both a rotating field for inner rotor IR and a rotating field for outer rotor OR and thus, inner and outer rotors IR and OR are rotated in and around the stator ST individually. The nature of the compound electric current is varied by information signals from the two speed sensors 64 and 65, so that each of the two rotors IR and OR can rotate at a desired speed.

In the following, advantages of the stator ST of the first embodiment will be described.

Due to provision of the elongate magnetic plate bars 8 each being positioned between adjacent two of the stator teeth 3 and near inner rotor IR, a desired magnetic bypass resistance is produced. Thus, even when alternation of the magnaflux takes place, a loss caused by eddy current can be reduced. It is to be noted that the laminated structure of the magnetic plate bars 8 exhibits a remarked work for reducing the loss. This advantage is not expected from the bolts 6 and 7 because these are of a solid structure.

Because the elongate magnetic plate bars 8 are members separate from the stator core that includes stator teeth 3, provision of magnetic plate bars 8 to stator ST does not induce a complicated structure of stator ST. Thus, production of stator ST is easily achieved without increasing the cost of the same.

As is described hereinabove, six polar pairs of magnets Mg1 and Mg2 are provided in outer rotor OR and three polar pairs of magnets Mg1 and Mg2 are provided in inner rotor IR. Accordingly, the magnetic flux from magnets Mg1 and Mg2 of inner rotor IR can produce a corresponding number of magnetic paths by using magnets Mg1 and Mg2 of outer rotor OR through stator ST, and the magnetic flux from magnets Mg1 and Mg2 of outer rotor RO can not produce a corresponding number of magnetic paths by using magnets Mg1 and Mg2 of inner rotor IR through stator ST. However, according to the invention, there are provided elongate magnetic plate bars 8 around and near inner rotor IR, as is described hereinabove. The magnetic plate bars 8 function to assist the magnetic flux from the magnets Mg1 and Mg2 of outer rotor OR to produce the corresponding number of magnetic paths. Because of the above-mentioned reason, there is no need of providing stator ST with a special structure by which production of the needed number of magnetic paths for outer rotor OR is assisted. Thus, production of stators ST is easily achieved without increasing the cost of the same.

Figure 5:
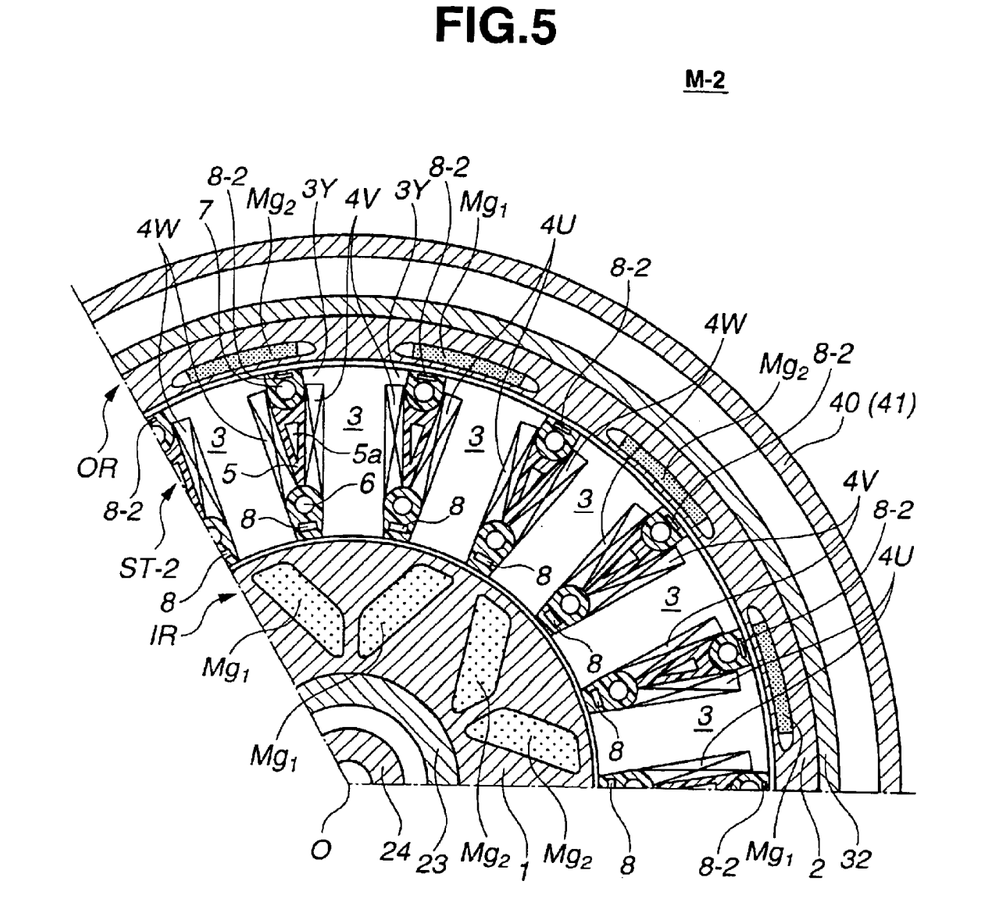
FIGS. 5, 6 and 7 are views similar to FIG. 3, but showing electric motors that are equipped with stators of second, third and fourth embodiments of the present invention respectively.

Referring to FIG. 5, there is shown an electric motor M-2 that is equipped with a stator ST-2 of a second embodiment of the present invention.

As is seen from the drawing, stator ST-2 of this second embodiment is substantially the same as stator ST of the above-mentioned first embodiment except that in the second embodiment, another elongate magnetic plate bar 8-2 is provided in the molded plastic 5 near outer rotor OR. That is, each magnetic plate bar 8-2 is placed between outer bolt 7 and a radially outer surface of stator ST-2.

Figure 6:
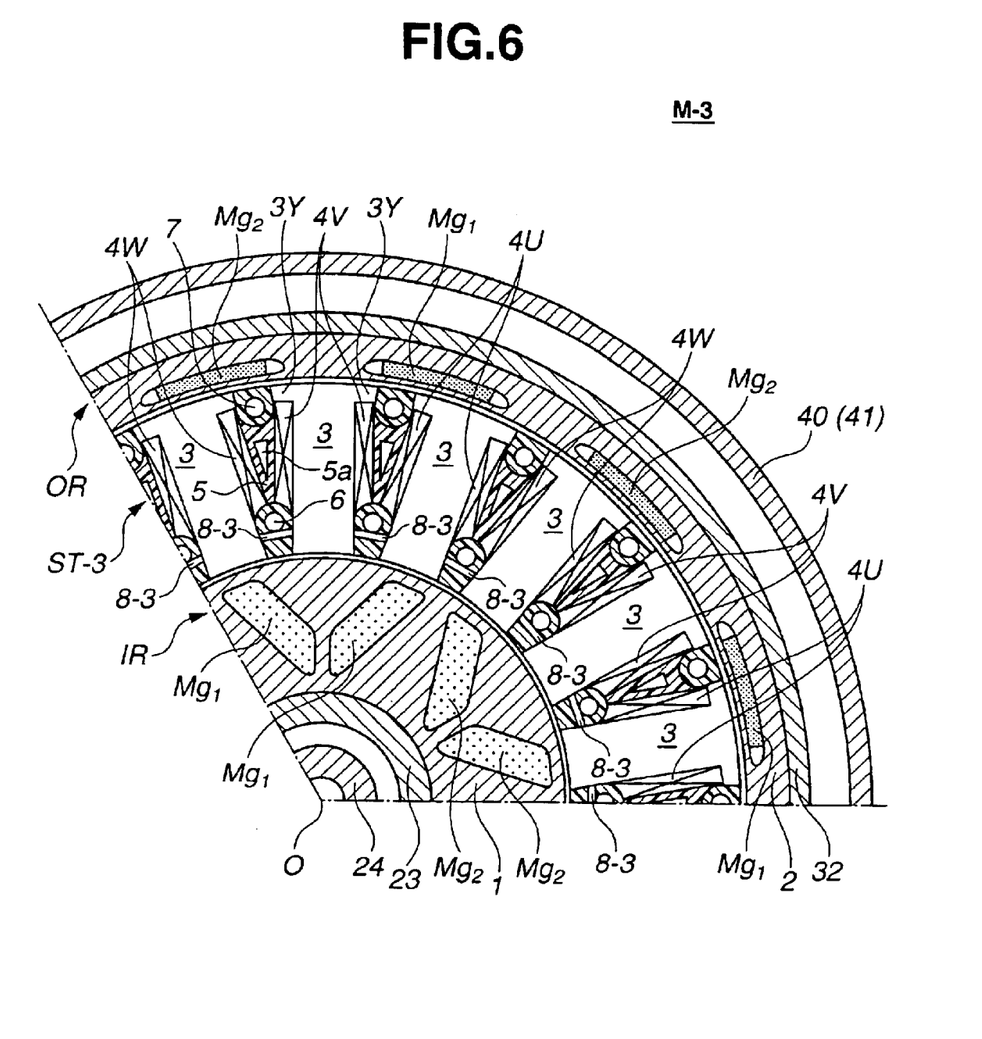

Referring to FIG. 6, there is shown an electric motor M-3 that is equipped with a stator ST-3 of a third embodiment of the present invention.

As is seen from the drawing, stator ST-3 of this third embodiment is substantially the same as stator ST of the above-mentioned first embodiment except that in the third embodiment, each elongate magnetic plate bar 8-3 has lateral edges that contact the two adjacent stator teeth 3. Because of a so-called bridge arrangement made by the magnetic plate bars 8-3, a mechanical strength of stator ST is increased, and because of the same reason, the magnetic plate bars 8-3 can be set in right positions in stator ST. Furthermore, due to the increased mechanical strength of stator ST, inner and outer bolts 6 and 7 can be reduced in size and weight, which brings about a reduced cost of stator ST.

Figure 7:
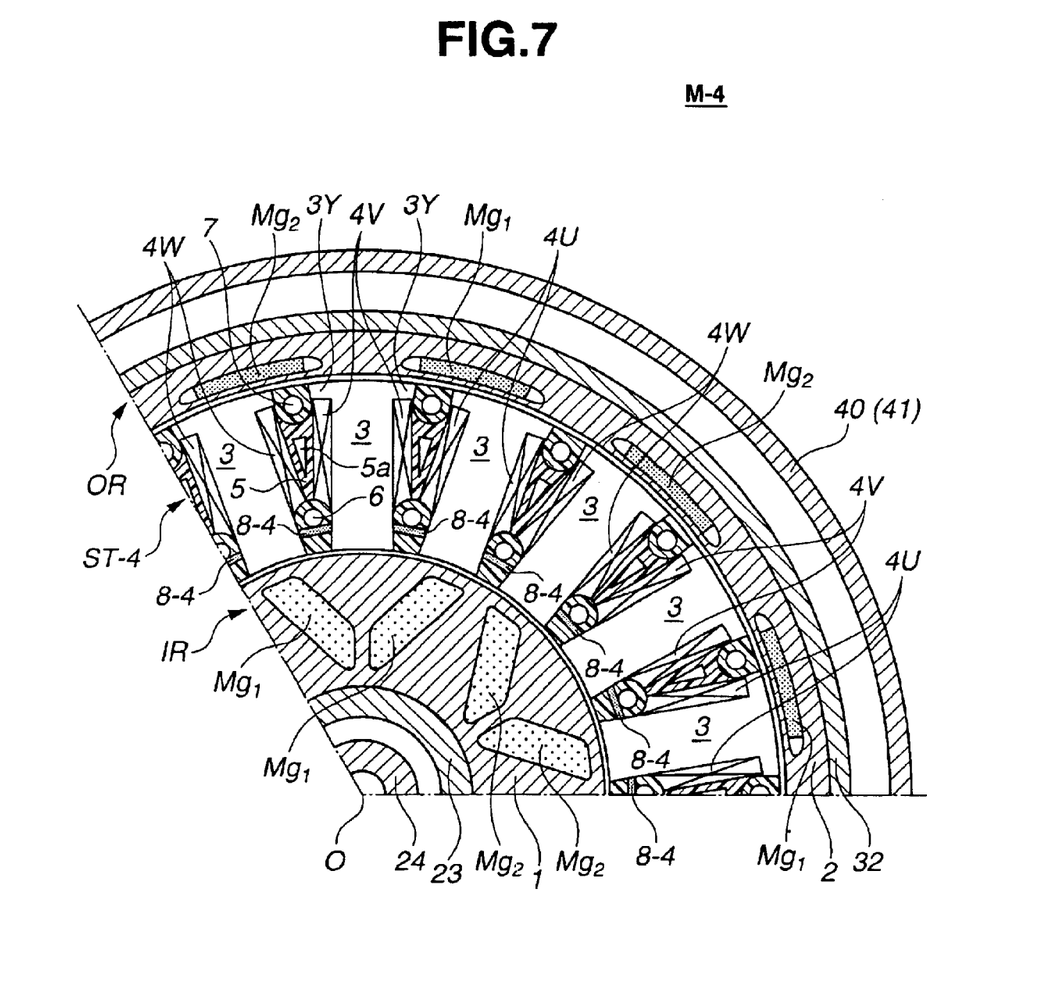

Referring to FIG. 7, there is shown an electric motor M-4 that is equipped with a stator ST-4 of a fourth embodiment of the present invention.

As is seen from the drawing, stator ST-4 of this fourth embodiment is substantially the same as the above-mentioned stator ST-3 of the third embodiment except that in the fourth embodiment, each elongate magnetic plate bar 8-4 is a powder magnetic core. As is known, the powder magnetic core has an iron loss that is smaller than that of a magnetic steel plate, and thus, the iron loss that is inevitably produced when the rotors IR and OR are driven by a high frequency compound electric current can be reduced. Accordingly, performance of the electric motor M-4 is increased. In general, the magnetic flux density provided by the powder magnetic core is small as compared with a magnetic steel plate. Thus, for putting the powder magnetic core into a practical use in stator ST, a certain size is needed by the powder magnetic core, which brings about an easiness with which the elongate magnetic plate bar 8-4 is produced from a powder magnetic material.

The entire contents of Japanese Patent Application 2003-146525 filed May 23, 2003 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A stator for use in a two rotor single stator type electric motor in which inner and outer rotors are rotated independently in and around the stator upon application of current to the stator, the stator comprising:

a stator core including a plurality of stator teeth that are circumferentially arranged around a common axis at evenly spaced intervals leaving a plurality of identical spaces each being defined between adjacent two of the stator teeth, each stator tooth including a plurality of flat magnetic steel plates that are aligned along the common axis while intimately and closely contacting to one another;

a plurality of coils put around the stator teeth respectively;

bolts that extend through the identical spaces of the stator core in a direction parallel with the common axis for combining the flat magnetic steel plates to have a fixed structure of the stator core;

a molded plastic that fills the identical spaces of the stator core; and a plurality of elongate plate bars that extend in the identical spaces through the molded plastic respectively, each elongate plate bar extending in parallel with the common axis and being constructed of a magnetic material that has an electric resistance higher than the bolts.

2. A stator as claimed in claim 1, in which each of the elongate plate bars extends in the vicinity of at least one of the inner and outer rotors.

3. A stator as claimed in claim 1, in which each of the elongate plate bars is a laminated magnetic metal bar that comprises a plurality of magnetic steel thin plates that are combined by an insulating member.

4. A stator as claimed in claim 1, further comprising other elongate plate bars that are constructed of a magnetic material and extend in the identical spaces through the molded plastic respectively, each of the other elongate plate bars extending in parallel with the common axis and constructed of a magnetic material that has an electric resistance higher than the bolts.

5. A stator as claimed in claim 1, in which each of the elongate plate bars extends in the vicinity of a selected one of the inner and outer rotors, the selected one rotor having polar pairs of which number is smaller than those of the other rotor.

6. A stator as claimed in claim 1, in which each of the elongate plate bars has lateral edges that contact the adjacent two of the stator teeth respectively.

7. A stator as claimed in claim 1, in which each of the elongate plate bars is a powder magnetic core.

8. A stator as claimed in claim 7, in which each of the elongate plate bars has lateral edges that contact the adjacent two of the stator teeth respectively.

9. A stator as claimed in claim 1, in which each of the elongate plate bars is placed between the bolt and a radially inner surface of the stator.

10. A stator as claimed in claim 1, in which each of the elongate plate bars is placed between the bolt and a radially outer surface of the stator.

11. A stator for use in a two rotor single stator type electric motor in which inner and outer rotors are rotated independently in and around the stator upon application of a compound electric current to the stator, the stator comprising:

a stator core including a plurality of stator teeth that are circumferentially arranged around a common axis at evenly spaced intervals leaving a plurality of identical spaces each being defined between adjacent two of the stator teeth, each stator tooth including a plurality of flat magnetic steel plates that are aligned along the common axis while intimately and closely contacting to one another;

a plurality of coils put around the stator teeth respectively;

two supporting brackets between which the stator teeth of the stator core are sandwiched;

bolts and nuts that fasten the two supporting brackets to tightly and intimately connect the magnetic steel plates of each stator tooth to one another, the bolts extending through the identical spaces in parallel with the common axis;

a molded plastic that fills the identical spaces of the stator core; and a plurality of elongate plate bars that extend in the identical spaces through the molded plastic respectively, each elongate plate bar extending in parallel with the common axis and being constructed of a magnetic material that has an electric resistance higher than the bolts.

12. A two rotor single stator type electric motor powered by a compound electric current, comprising:

a cylindrical stator that includes a stator core including a plurality of stator teeth that are circumferentially arranged around a common axis at evenly spaced intervals leaving a plurality of identical spaces each being defined between adjacent two of the stator teeth, each stator tooth including a plurality of flat magnetic steel plates that are aligned along the common axis while intimately and closely contacting to one another; a plurality of coils put around the stator teeth respectively; bolts that extend through the identical spaces of the stator core in a direction parallel with the common axis for combining the flat magnetic steel plates to have a fixed structure of the stator core; a molded plastic that fills the identical spaces of the stator core; and a plurality of elongate plate bars that extend in the identical spaces through the molded plastic respectively, each elongate plate bar extending in parallel with the common axis and being constructed of a magnetic material that has an electric resistance higher than the bolts;

a cylindrical inner rotor rotatably received in the cylindrical stator, the inner rotor having a plurality of permanent magnets disposed thereon; and a cylindrical outer rotor rotatably disposed around the cylindrical stator, the outer rotor having a plurality of permanent magnets disposed thereon.

* * * * *